(12) United States Patent
Gill et al.

(10) Patent No.: US 8,019,783 B2
(45) Date of Patent: Sep. 13, 2011

(54) SEARCH INTERFACE FOR FINDING DATA ITEMS OF INTEREST FROM A DATABASE SYSTEM

(75) Inventors: Bikram Singh Gill, Mohail (IN); Amar Kangod Ganapathi, Bangalore (IN); Santosh Kumar Rath, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 322 days.

(21) Appl. No.: 12/468,078

(22) Filed: May 19, 2009

(65) Prior Publication Data

US 2010/0299348 A1    Nov. 25, 2010

(51) Int. Cl.
*G06F 17/30* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 7,003,730 B2 * | 2/2006 | Dettinger et al. | 715/764 |
| 2007/0214179 A1 | 9/2007 | Hoang | |
| 2007/0288436 A1 | 12/2007 | Cao | |
| 2008/0005076 A1 | 1/2008 | Payne et al. | |
| 2008/0168042 A1 | 7/2008 | Dettinger et al. | |
| 2008/0168352 A1 | 7/2008 | Mehrotra et al. | |

FOREIGN PATENT DOCUMENTS

EP    1566745 A1    8/2005

OTHER PUBLICATIONS

"Magesh Jayapandian et al.,", "Expressive Query Specification Through Form Customization", "http://www.eecs.umich.edu/db/files/ edbt08.pdf", Dated: Mar. 2008, pp. 1-12.
"Tao Cheng et al.,", "Supporting Entity Search: A Large-Scale Prototype Search Engine", "http://delivery.acm.org/10.1145/1250000/1247636/p1144-cheng.pdf?key1=1247636&key2=3083208121&coll=GUIDGE&dl=GUIDE&CFID=80970385&CFTOKEN=88927221", Dated: Jun. 2007, pp. 1144-1146.
"Jerry Alan Fails et al.,", "A Visual Interface for Multivariate Temporal Data: Finding Patterns of Events Across Multiple Histories", "http://citeseerx.ist.psu.edu/viewdoc/downloa d;jsessionid=DB1383199A626B1C6F52640ECC752340?doi=10. 1.1.65.6661&rep=rep1&type=pdf", Downloaded Circa: Aug. 6, 2008, pp. 1-8.

* cited by examiner

*Primary Examiner* — Isaac M Woo
(74) *Attorney, Agent, or Firm* — Narendra Reddy Thappeta

(57) ABSTRACT

A computer implemented approach which identifies secondary entities associated with a (primary) entity selected by a user, and enables the user to find entity instances of interest by performing a search based on the attributes of the user selected primary entity and one or more of the identified secondary entities. In an embodiment, the secondary entities are identified based on a schema defining the entity types in a database system. The search may be used to retrieve (and provide to the user) only the entity instances matching the conditions specified based on the attributes of the primary entity and the secondary entities. The user interface may accordingly be simplified.

20 Claims, 12 Drawing Sheets

SEARCH INTERFACE FOR FINDING DATA ITEMS OF INTEREST FROM A DATABASE SYSTEM

BACKGROUND

1. Technical Field

The present disclosure relates to database technologies and more specifically to providing a search interface for finding data items of interest from a database system.

2. Related Art

A database system facilitates storage and retrieval of data from secondary storage using structured queries. Structured queries provide for indication of specific conditions that have to be satisfied by data returned in response to the queries. In general, the data returned is independent of the sequence/location at which the data is stored/present in the underlying secondary storage. Structured Query Language (SQL), in case of relational databases, is an example query language using which structured queries are issued to database system, as is well known in the relevant arts.

The data in the database system is stored in the form of data items. A data item is the smallest unit of data that can be retrieved from the database system using the structured queries. In the case of a relational database, in which data is organized in the form of tables, the data stored at the intersection of a column and a row (of a table) represents a data item.

Search interfaces are provided to enable users to find data items of interest. The interfaces are GUI (graphical user interface) based, to simplify various tasks (e.g., specifying conditions for selection of the data items to be returned) the user may need to perform for the search. In general, it is desirable that the search interfaces be as user friendly as possible.

BRIEF DESCRIPTION OF THE DRAWINGS

Example embodiments of the present invention are described with reference to the accompanying drawings briefly described below.

FIGS. 2A and 2B depict the manner in which search interfaces are provided in alternative approaches in one embodiment.

Figure 7:
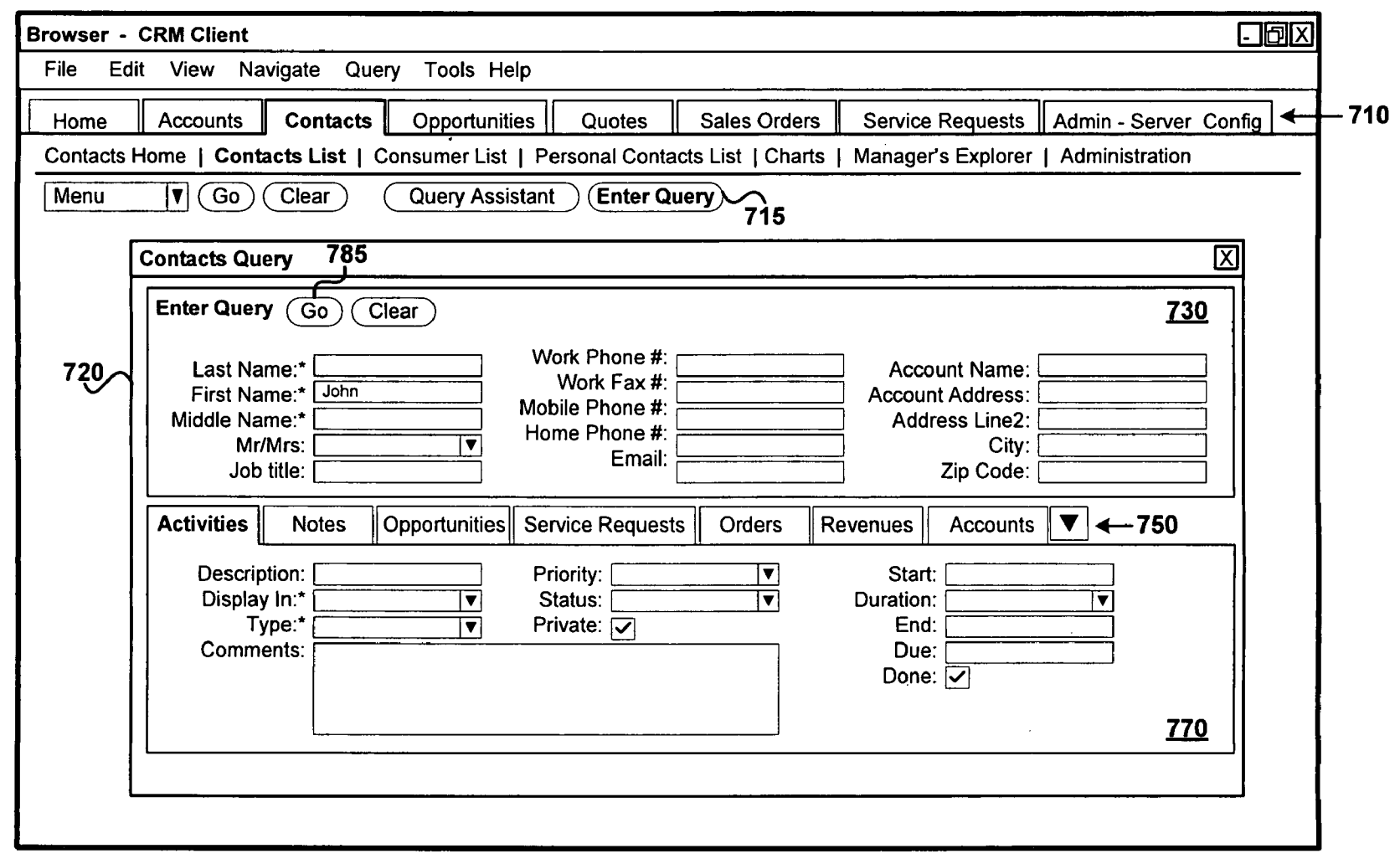
Figure 8:
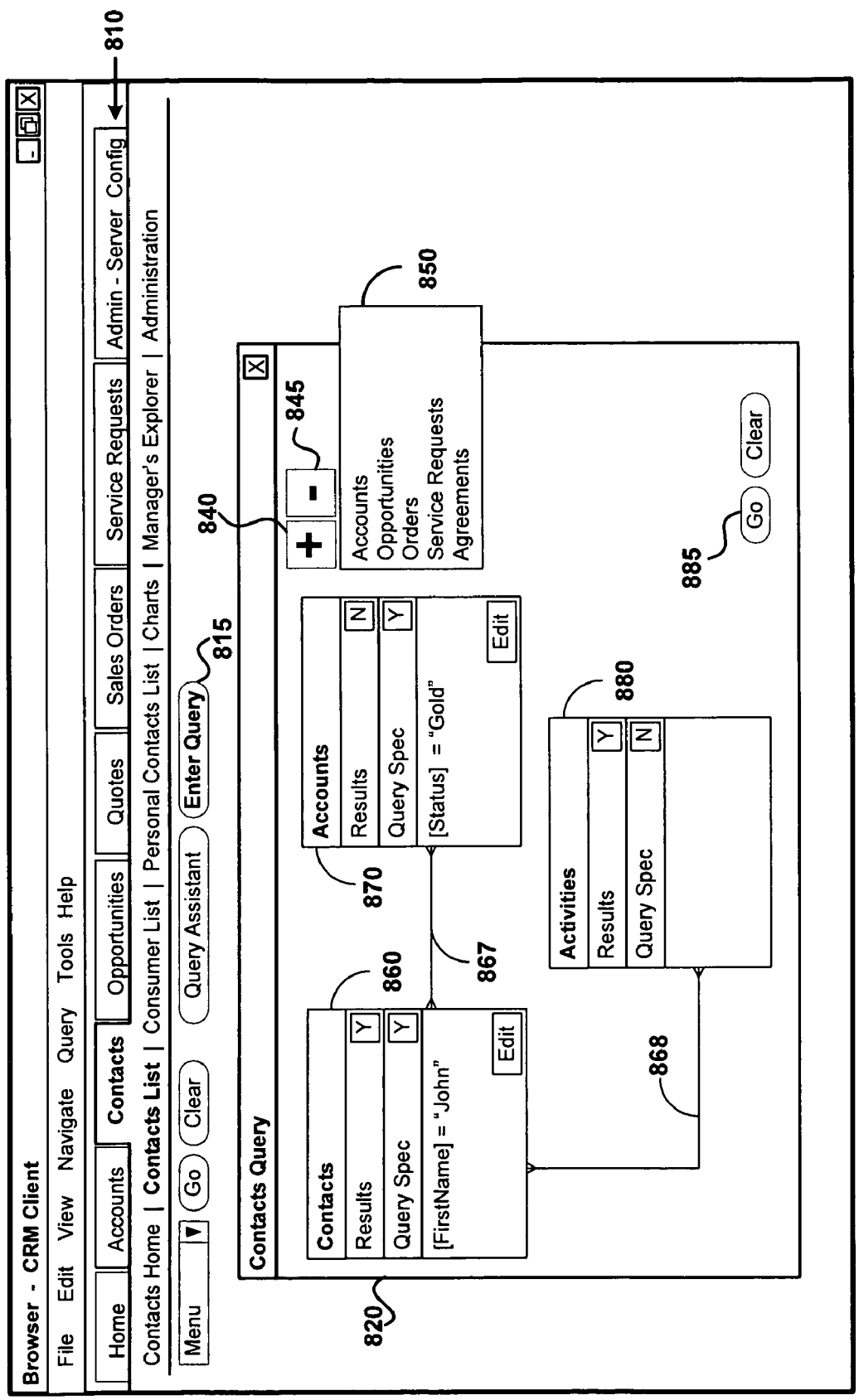

Each of FIGS. 7 and 8 depicts alternative embodiments of the search interface for finding data items of interest in a database system.

Figure 9:
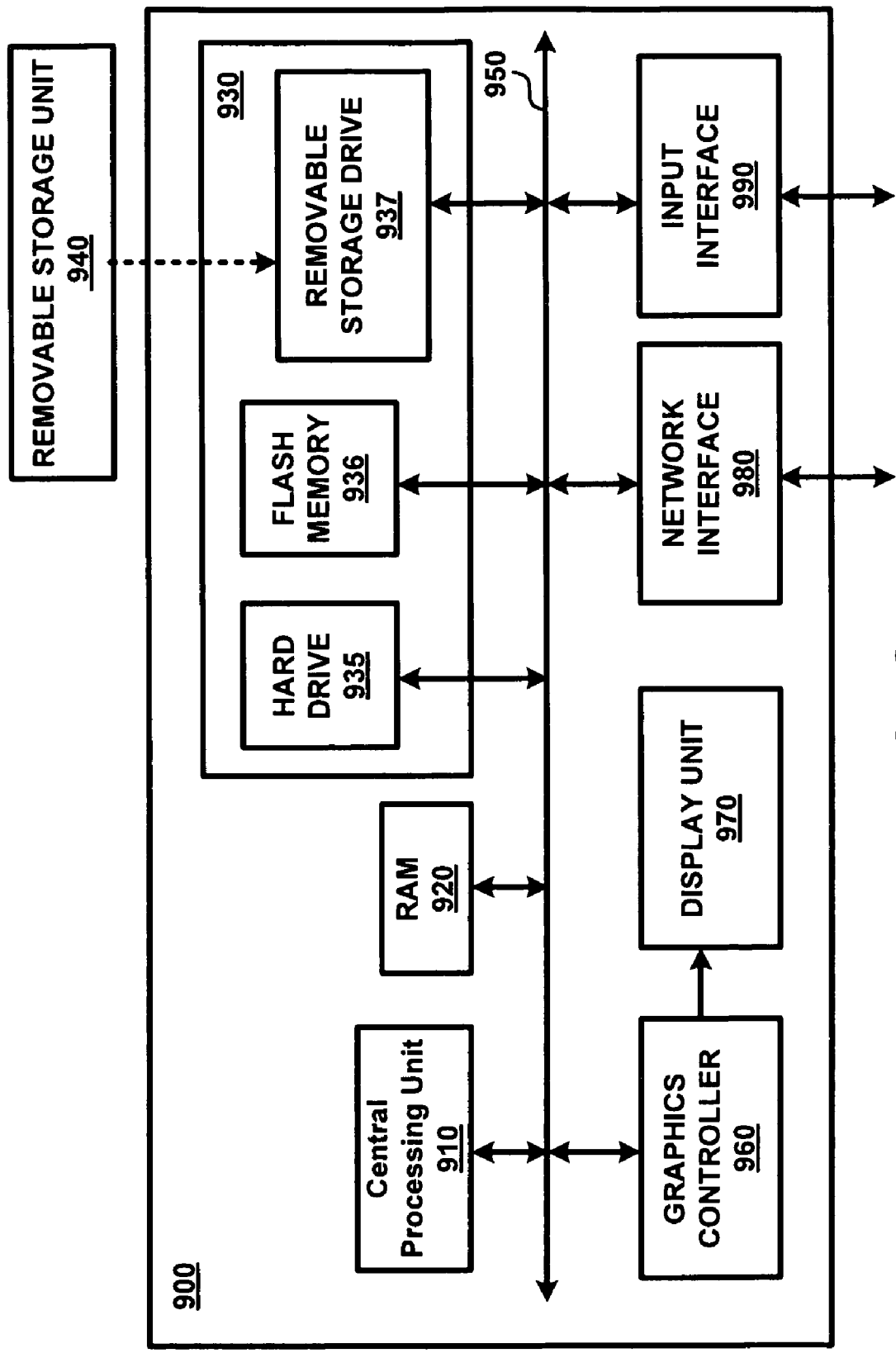

FIG. 9 is a block diagram illustrating the details of a digital processing system in which various aspects of the present invention are operative by execution of appropriate software instructions.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention identifies secondary entities associated with an (first) entity type selected by a user, and enables a user to search for entity instances of interest based on the attributes of an identified secondary entity. In an embodiment, the secondary entities may be identified based on a schema defining the entities in a database system. The search may be used to retrieve (and provide to the user) only the entity instances matching the conditions specified based on the attributes of the first entity type and the identified secondary entities. The user interface may accordingly be simplified.

In an embodiment, a user is provided the ability to retrieve desired entity instances of interest satisfying conditions based on combination of a (selected) primary entity and a related secondary entity by sending a single user/search request. A single user/search request implies that the user first specifies all the desired conditions/criteria for the primary/secondary entities and then only a search of the data items (entity instances) in the database is conducted. The user interface may accordingly be further simplified.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
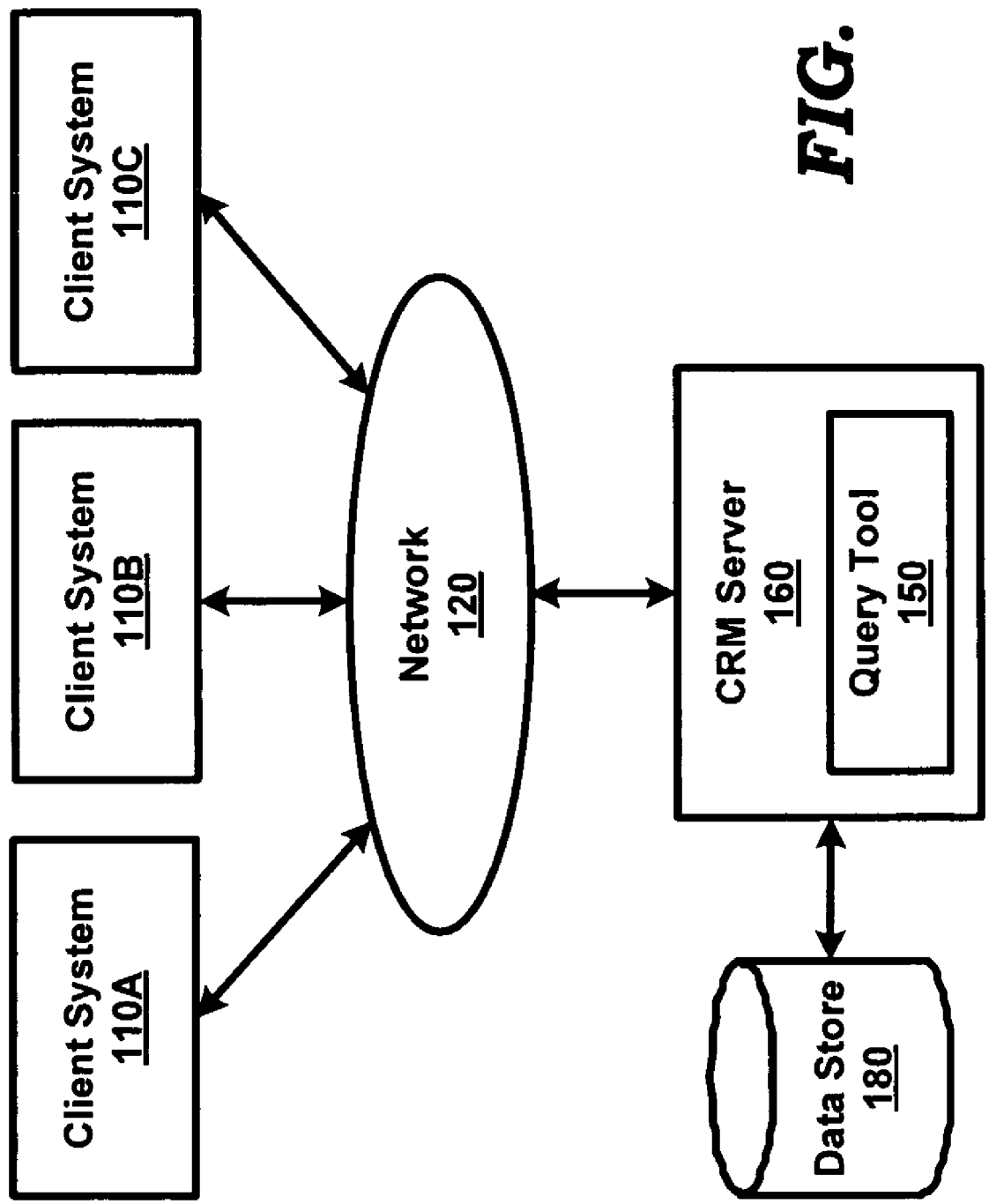
FIG. 1 is a block diagram illustrating an example environment (computing system) in which several aspects of the present invention can be implemented.

FIG. 1 is a block diagram illustrating an example environment (computing system) in which several aspects of the present invention can be implemented. The example computing system represents a Customer Relationship Management (CRM) system which enables a business organization to manage relationships with its customers, in particular, to handle customer related activities such as marketing campaigns, enquiries, sales, technical support, complaints handling, etc. However, the features can be implemented in various other types of computing systems, as will be apparent to one skilled in the relevant arts, by reading the disclosure provided herein.

The example computing/CRM system is shown containing client systems 110A-110C, network 120, CRM server 160 (containing query tool 150) and data store 180. Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between client systems 110A-110C and CRM server 160. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Data store 180 represents a non-volatile storage, facilitating storage and retrieval of a collection of data used by one or more CRM applications executing in CRM server 160. In one embodiment, data store 180 is implemented using relational database technologies and therefore provides storage and retrieval of data using structured queries such as SQL (Structured Query Language). SQL refers to a special-purpose, generally non-procedural language (generally indicates what to retrieve based on conditions, in contrast to how to retrieve) that supports the definition, manipulation, and control of data in systems implementing relational database technologies.

In one embodiment, the data used by the CRM applications is modeled as one or more entity types that are related to each other. Entity types are used to model/represent physical or conceptual objects (business elements such as a customer, a contact, a service request, an enquiry, etc.) according to the requirements of a business environment modeled by a CRM system. Each entity type generally models a corresponding object (type) and contains fields, typically termed "attributes", which may be analogized to columns of a table when the entity type/object type is mapped to a table (or a view) of a relational database system. An entity type may also be mapped to multiple tables (provided for security/efficiency reasons) in the database system.

An entity instance represents an instance of an object (type) modeled by the corresponding entity type. The entity instance would thus generally have a corresponding value for each of the attributes defining the entity/object type. Entity instances may be analogized to rows of a table (mapped to the object type) of a relational database system in the example scenario noted above.

Relationships are often defined between entity types to model/represent the physical/conceptual relations existing between the corresponding object types (e.g. "raised by" relation between service request and customer, "has a" relation between customer and contact, etc.). Each relationship may identify an entity type as a primary entity, another (or the same) entity type as a secondary entity and a relationship type (one to one, one to many, many to many, etc.) between the primary entity and the secondary entity.

As is well known, in a relational database system, a primary entity is a table containing a primary key and a corresponding secondary entity is another table having an associated foreign key tied to the primary key. In a scenario that the relation type is one to one or one to many, the table representing the secondary entity contains attribute(s) which forms the associated foreign key tied to the primary key of the primary entity, in addition to its own corresponding attributes.

Alternatively, generally when the relationship type is many to many, both the tables corresponding to primary and secondary entities contain respective primary keys, while a third/intermediate table is used for storing the foreign key mapping between primary and secondary entities. In other words, the intermediate table stores the desired values of associated foreign key (of the secondary entity) that are tied to the specific values of the primary key (of the primary entity). It may be appreciated that any number of intermediate entities and tables relating the primary and secondary entity with required combination of primary and foreign keys stored in intermediate tables may be used, in particular, when the primary and secondary entities are not directly related.

It should be further appreciated that the primary-foreign key relationship is an example scenario defining the primary and secondary entities according to the relationships based on which data items are stored in a database system. However, other criteria (according to the relationships) may also be used in identifying the secondary entities. Further, it should be noted a secondary entity in one relationship may be a primary entity in other relationships, and a primary entity in one relationship may be a secondary entity in other relationships.

In one embodiment, data store 180 maintains data (in the form of a schema definition) indicating the details/attributes of the entity types (such as customer, contacts, accounts, service requests, etc.), the details of the transactions performed on the entity types/instances, the relationships defined between the entity types in the CRM system (such as "raised by", "has a", etc.), the specific attribute(s) forming the primary/secondary key, etc. In particular, the schema defines the relationships between various entity types.

CRM server 160 represents a server system, such as a web and/or application server, executing various applications for handling different CRM functions such as marketing, billing, customer contact, etc. For example, a contact application may be designed to handle functions such as adding/removing contacts from the CRM system, searching for contacts using appropriate search interfaces, etc.

In general, each CRM application is designed to receive requests for performing tasks from users using one of client system 110A-110C, perform the requested task on data maintained internally or on external data (maintained in data store 180) and to send the result of performance of the tasks as corresponding responses to the requesting client system. CRM server 160 may also contain other software programs such as operating system, device drivers, etc., (not shown) which provide a (common) run time environment for execution of the CRM applications.

Each of client systems 110A-110C represents a system such as a personal computer, workstation, mobile station, etc., used by users (such as representatives/agents acting on behalf of the business organization) to generate requests to applications executing in CRM server 160. The requests may be generated using appropriate user interfaces. In general, a client system requests an application for performing desired tasks and receives corresponding responses containing the results of performance of the requested tasks from the application.

Client systems 110A-110C may be used by users/representatives to access information of interest related to different customers (for example, data items such as name, address of a customer, contact, the details of the accounts associated with a contact, the details of the service requests raised by a customer/contact, etc.) while handling incoming product support or information inquiry contacts from the customers. Alternatively, the data items of interest may also be accessed to enable outgoing calls for telemarketing, sending reminders, debt collection, etc. Accordingly, users/representatives using client systems 110A-110C may be provided (by applications executing in CRM server 160) search interfaces for finding the data items of interest maintained in data store 180.

Query tool 150 executing in CRM server 160 and implementing various aspects of the present invention, provides a convenient search interface for finding data items of interest in the CRM system, as described below with examples. Query tool 150 may be provided as an independent application or tightly with a CRM application executing in CRM server 160. The features of the present invention will be clearer in comparison with alternative approaches, which are described below in further detail.

3. Alternative Approaches

Search interfaces are generally provided to enable users of the CRM system to search for data items of interest in a database system (such as data store 180). In general, the data items of interest (sought to be searched for) represent entity instances, with the entity instance being one of a multiple entity types. Accordingly, a user specifies conditions associated with each of the attributes of the entity types, with each condition often indicating an attribute of interest, a data value and a comparison result to be (not) satisfied. The entity instances matching the conditions are then retrieved and displayed to the user.

In one approach, the user is restricted to specifying conditions for a pre-defined set of attributes (of different entity types) using the search interfaces. Such search interfaces typically enable the user to specify search conditions for many of the attributes of a single entity type and a few of the attributes of the related/other entity types. The pre-defined set of attributes may be specified (either as a fixed or a configurable set) within the program logic implemented in the search interface. Such an approach is described below with respect to the search interfaces of FIGS. 2A-2B.

Figure 2A:
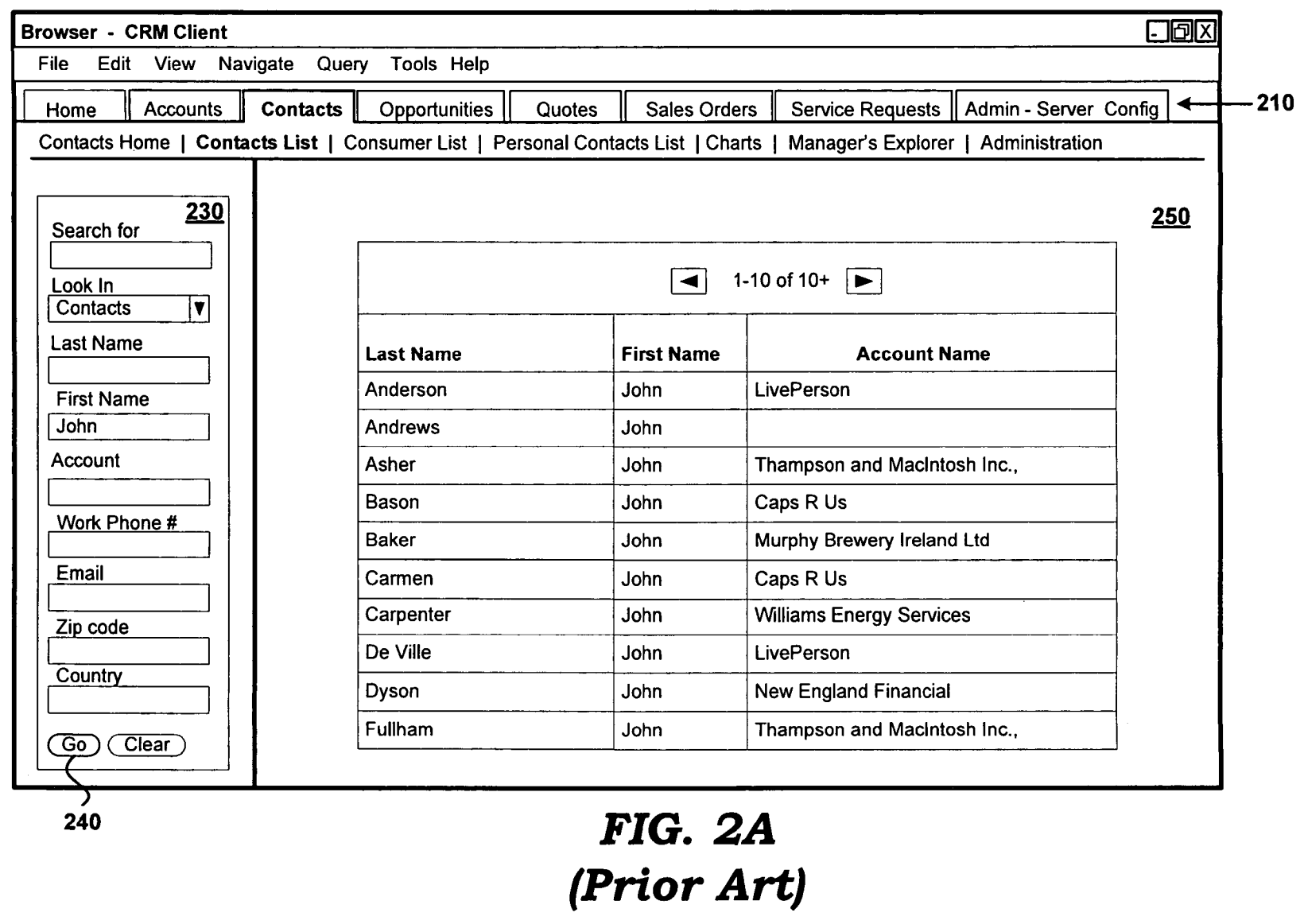

Referring to FIG. 2A, a pre-specified (hard coded or configured in the metadata, in the program logic) set of entity types are shown displayed as tabs. A user is enabled to select an entity type of interest such as "Contacts" using the tabs in display area 210. A pre-specified set of attributes based on which search criteria can be specified, are shown displayed in display area 230. The user then specifies the conditions (e.g. First Name="John") for attributes of the entity type "Contacts" in display area 230. On a user clicking button 240 (labeled "Go"), the details of the entity instances of type "Contacts" satisfying/matching the specified conditions is displayed in display area 250.

It should be noted that the field "Account" may represent an attribute of the "Contact" entity type or an attributes of another/related "Account" entity type. In either case, the search interface of FIG. 2A has the limitation of showing only a pre-defined set attributes, and does not allow a user for specifying any possible search criteria on related entity types, such as "Order", "Opportunities", etc.

Figure 2B:
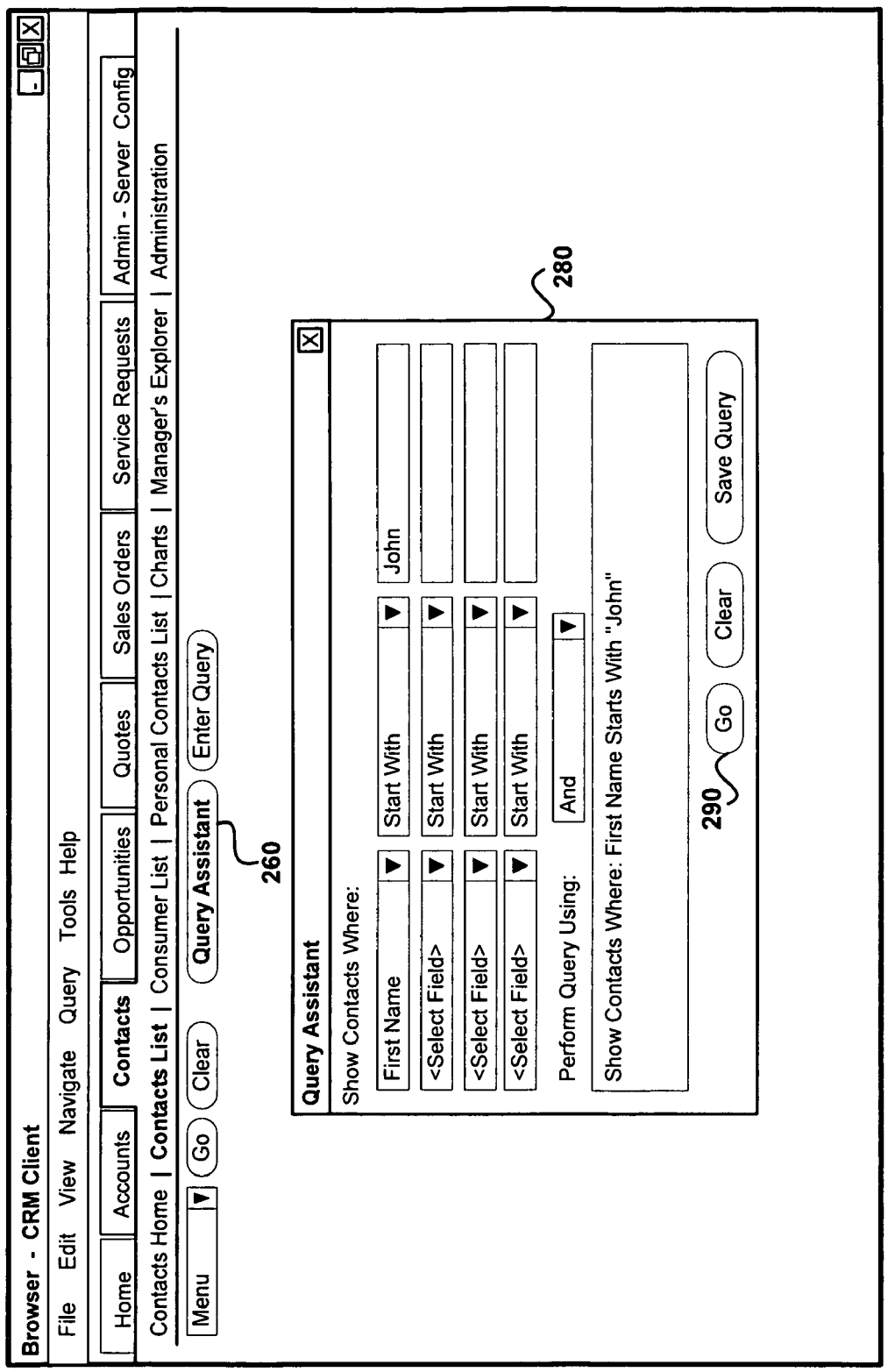

Referring to FIG. 2B, display area 280 represents a pop-up window that is displayed when a user selects/clicks button 260 (labeled "Query Assistant"). Display area 280 enables a user to specify complex conditions (using operators such as "start with", "not equal", "and", "or", etc.) for a pre-defined/specified (i.e., hard coded in the program logic) set of attributes of entity types made available in area 280. On user clicking button 290 (labeled "Go"), the details of the corresponding matching entity instance of type "Contacts" may be displayed similar to display area 250.

As may be observed, the user is restricted to specifying conditions on attributes of only a single entity type (and a few of the attributes of the related entity types that are displayed along with the primary entity). That is, the search is limited to those pre-defined set of attributes made available by a programmer who would have implemented/designed the program logic providing the interfaces of FIGS. 2A and 2B.

Such a restriction may not be desirable in certain scenarios, for example, when entity types are required to be searched based on attributes other than those in the pre-defined set. As an illustration, a user desiring to find contacts (primary entity) having a gold account (secondary entity) and having raised at least one email service request (another secondary entity) cannot use the search interfaces of FIGS. 2A and 2B to find the desired instances of "Contacts".

In such a scenario, the user may be required to perform multiple independent searches (using corresponding search interfaces) and to manually compare the search results for identifying the data items of interest. Alternately, the user may be required to perform multiples searches in a cascading manner, wherein the user performs a first search based on the attributes of a first entity type (e.g. "Contacts") and then perform a second search within the results of the first search based on the attributes of a second entity type (e.g. "Accounts").

Several features of the present invention overcome at least some of the drawbacks described above. Accordingly, the description is continued illustrating the manner in which query tool 150 provides a search interface for finding data items of interest in a database system.

4. Finding Data Items of Interest

Figure 3:
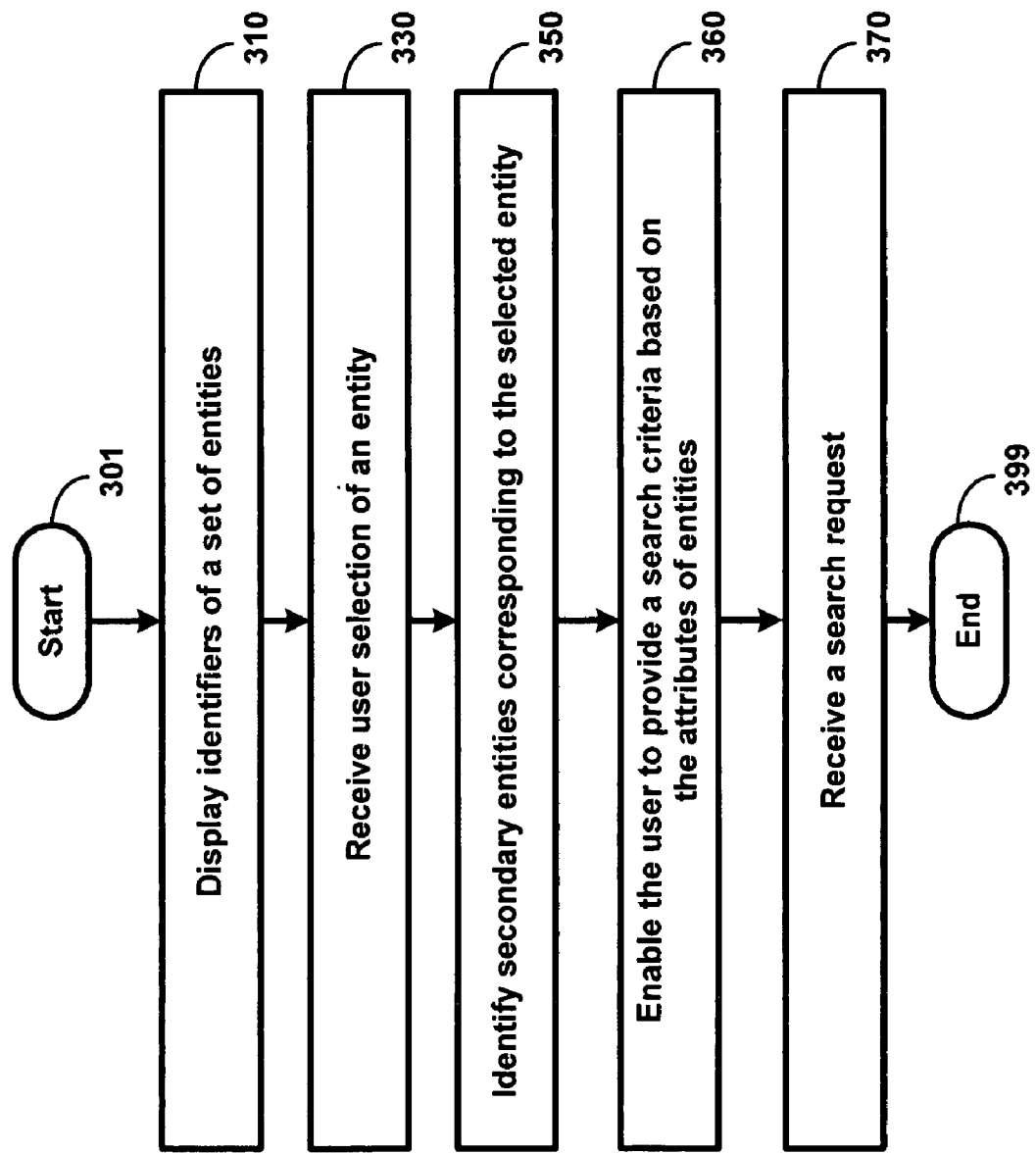
FIG. 3 is a flowchart illustrating the manner in which a search interface for finding data items of interest in a database system is provided according to several aspects of the present invention.

FIG. 3 is a flowchart illustrating the manner in which a search interface for finding data items of interest in a database system is provided according to various aspects of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, query tool 150 (or another CRM application) displays in a user/search interface identifiers of a set of entity types (maintained in data store 180). The identifiers of the set of entity types may be displayed in any convenient manner, such as corresponding tabs, in a selection list control, in the form of a group of radio buttons, etc.

The user/search interface may be provided (by the CRM application or query tool 150) in response to receiving a request from a user using one of client systems 110A-110C, for example, by clicking/selecting a suitable menu option, pressing/selecting a pre-defined keyboard shortcut, etc. The user/search interface (and the entity identifiers) may be provided on a display unit (not shown in FIG. 1) associated with the requesting client system.

In the embodiments described below with respect to FIGS. 4A-4C, the set of entity types is hard-coded (pre-defined) in the program logic (or configured in the metadata) of the CRM application. However, in alternative embodiments, query tool 150 (or the CRM application) may determine the specific set of entity types (in data store 180) whose identifiers are to be displayed, for example, based on the access control privileges associated with the specific user using the CRM system, pre-configuration of the CRM system by the specific user, application configurator, etc. The determination may be performed base on a schema definition maintained in data store 180. Further, the set of entity types may include all the entity types defined in data store 180 or a subset thereof.

In step 330, query tool 150 receives a user selection of an entity type (from the identifiers of the set of entity types displayed in step 310). The user selection may be performed using various input devices. For example, when the set of entity types is displayed as corresponding tabs, the user may select the entity type by selecting (clicking on) the specific tab identified by the entity identifier. Alternatively, when the identifiers of entities are displayed as a group of radio buttons, the user may select the specific radio button corresponding to the entity type from the group.

In step 350, query tool 150 identifies secondary entities corresponding to the selected entity type. Query tool 150 may first inspect the schema definition maintained in data store 180 to determine the relationships in which the selected entity type is a primary entity and then identify the secondary entities specified in the determined relationships.

In step 360, query tool 150 enables the user to provide a search criteria (to find data items of interest) based on the attributes of the identified secondary entities and the selected entity of step 330. Search criteria represent one or more conditions which are to be considered in selecting matching entity instances. Each search condition contains a corresponding attribute, a condition operator, and one or more data values. The user may specify more than one condition for an attribute and/or for the entity type.

Query tool 150 may identify corresponding attributes of each of the selected/secondary entity types and provide them as part of the search interface, thus enabling the user to specify search criteria using the attributes in a convenient manner. The identification of the secondary entity types and the corresponding attributes may be performed based on the schema definition maintained in data store 180 or by inspecting the run-time entity instances of the CRM system.

In step 370, query tool 150 receives from the user, a search request containing the search criteria. The search criteria contains one or more conditions combined by appropriate logical operators (AND, OR, etc.), with each combination in turn containing an attribute identifier, a value and a relational operator (equal to, greater than, etc.). Each data item (stored in data store 180) matching the search criteria are deemed to be a data item of interest.

Accordingly, in response to receiving the search request, query tool 150 examines the data contained in data store 180 and determines the data items of interest (as indicated in the search request) that match the search conditions specified in the search criteria. The determined data items of interest (such as the attributes of the selected entity type) may then be displayed as part of the search interface (or as a different interface) to enable the user to view the result of the search.

In one embodiment, when data store 180 is implemented as a relational database, query tool 150 generates a SQL query corresponding to the criteria specified in the received search request. The generated SQL query is designed to retrieve the data items of interest (such as the attributes of the instances of the primary entity) that satisfy the conditions specified in the search criteria. The retrieved instances are then displayed to the user as part of the search interface. The flow chart ends in step 399.

Thus, a user by specifying search conditions for attributes associated with multiple entity types (such as the selected entity type and the related secondary entities) is enabled to find data items of interest (e.g. instances of a primary entity) in a convenient manner and generally using less amount of time and/or resources. Further, the user is not restricted to specifying conditions for a pre-defined set of attributes made available by a programmer of the search interface.

It may be observed that a user using one of clients systems 110A-110C, first (in step 360) specifies the desired search criteria/conditions based on the attributes of the selected entity and/or the identified secondary entities and then sends (in step 370) a single user/search request containing the search criteria for finding the data items of interest. In other words, the data items in the database are searched for, only after all the criteria (desired conditions) have been specified by the user. Such a feature may be particularly desirable in client-server environments such as the example environment shown in FIG. 1.

It should be appreciated that the search interface described above (with respect to FIG. 3) can be provided in different forms, based on the design of the CRM system, the requirements of the users/representatives using the CRM system, the technology used to implement the CRM system, etc. An example search interface provided according to several aspects of the present invention is described in detail below.

5. Example Search Interface

Figure 4A:
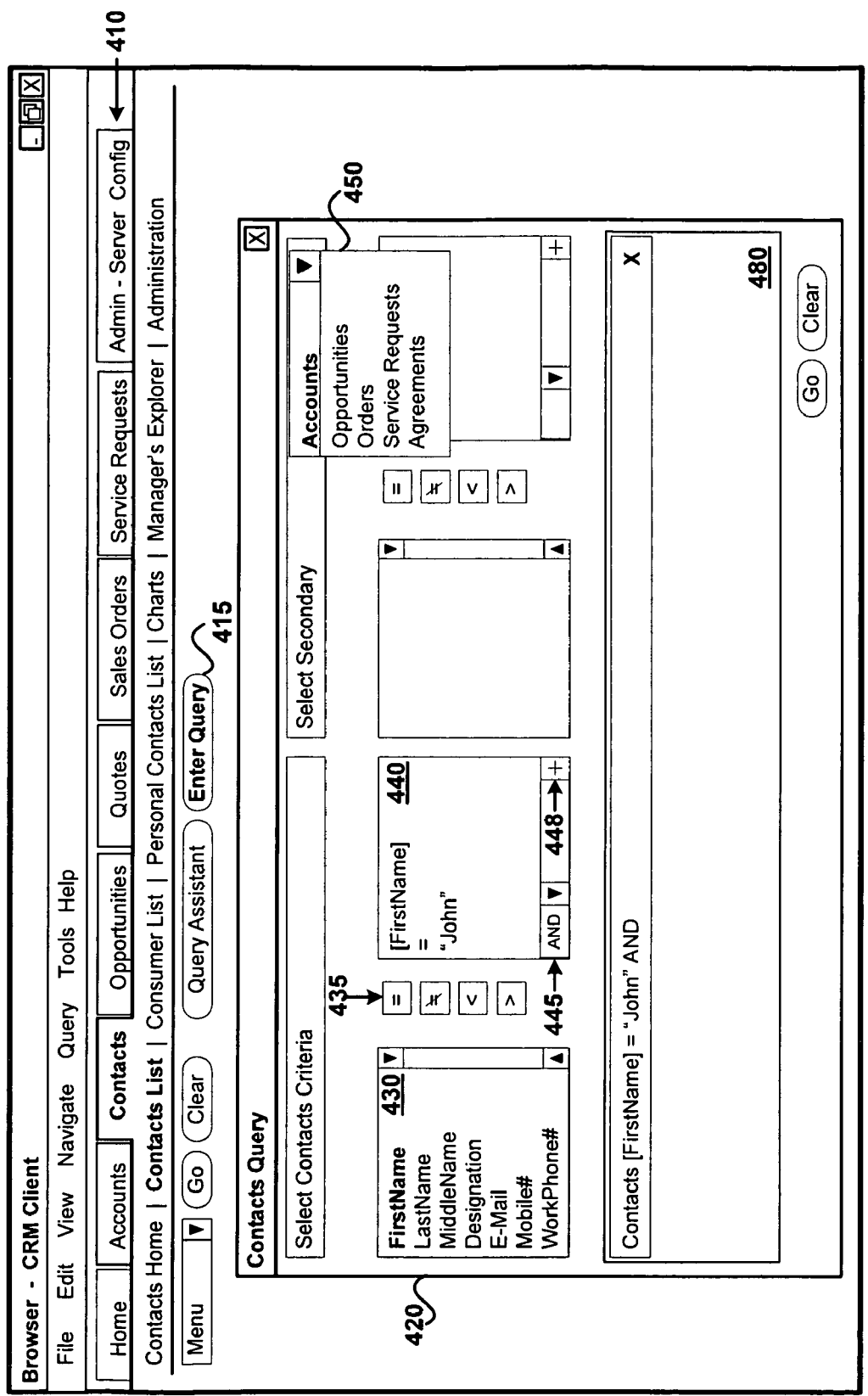
FIG. 4A depicts a portion of a search interface which displays secondary entities corresponding to an entity type selected by a user, in one embodiment.
Figure 4B:
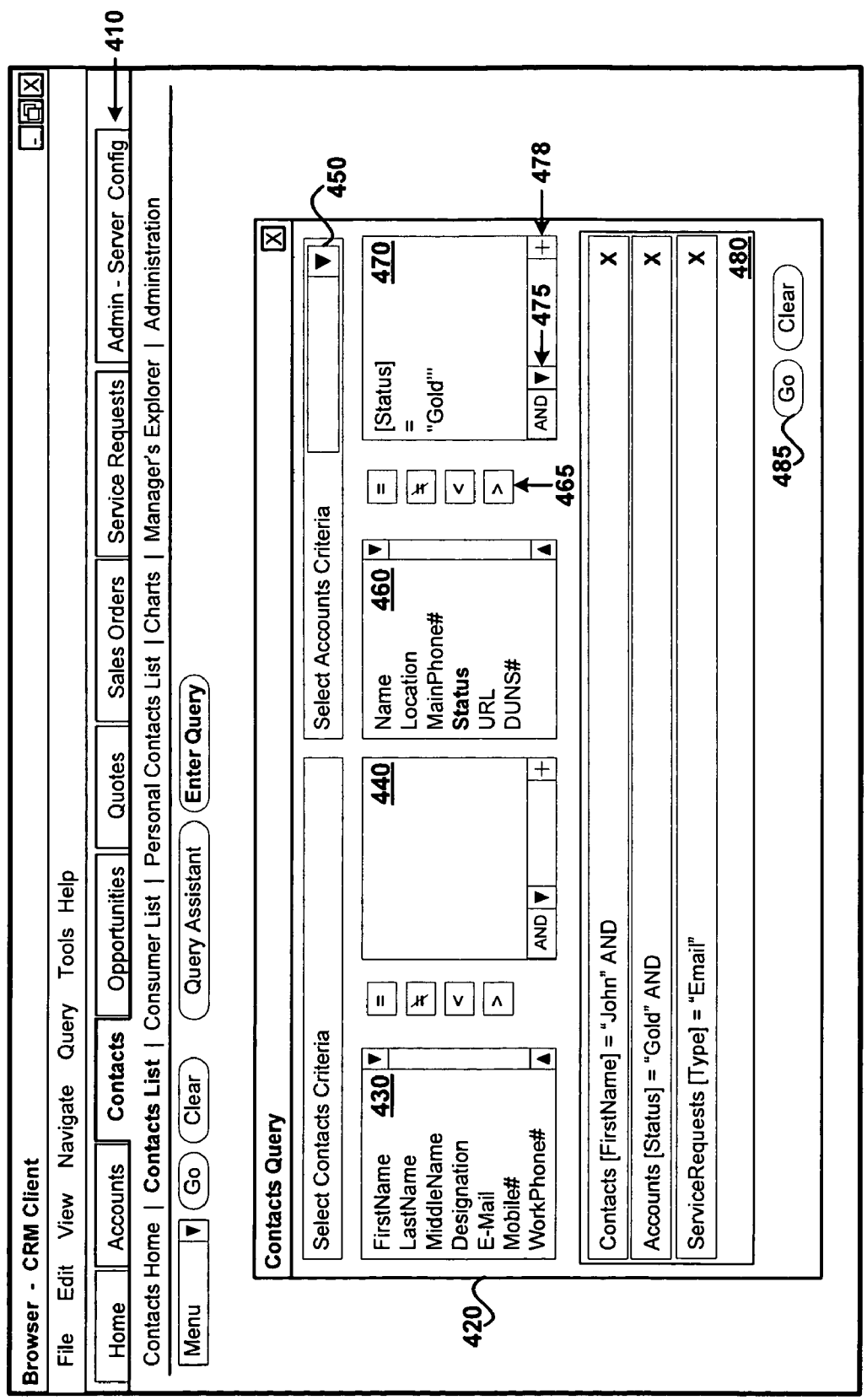
FIG. 4B depicts a portion of a search interface which enables a user to specify search conditions for attributes of a selected secondary entity type in one embodiment.
Figure 4C:
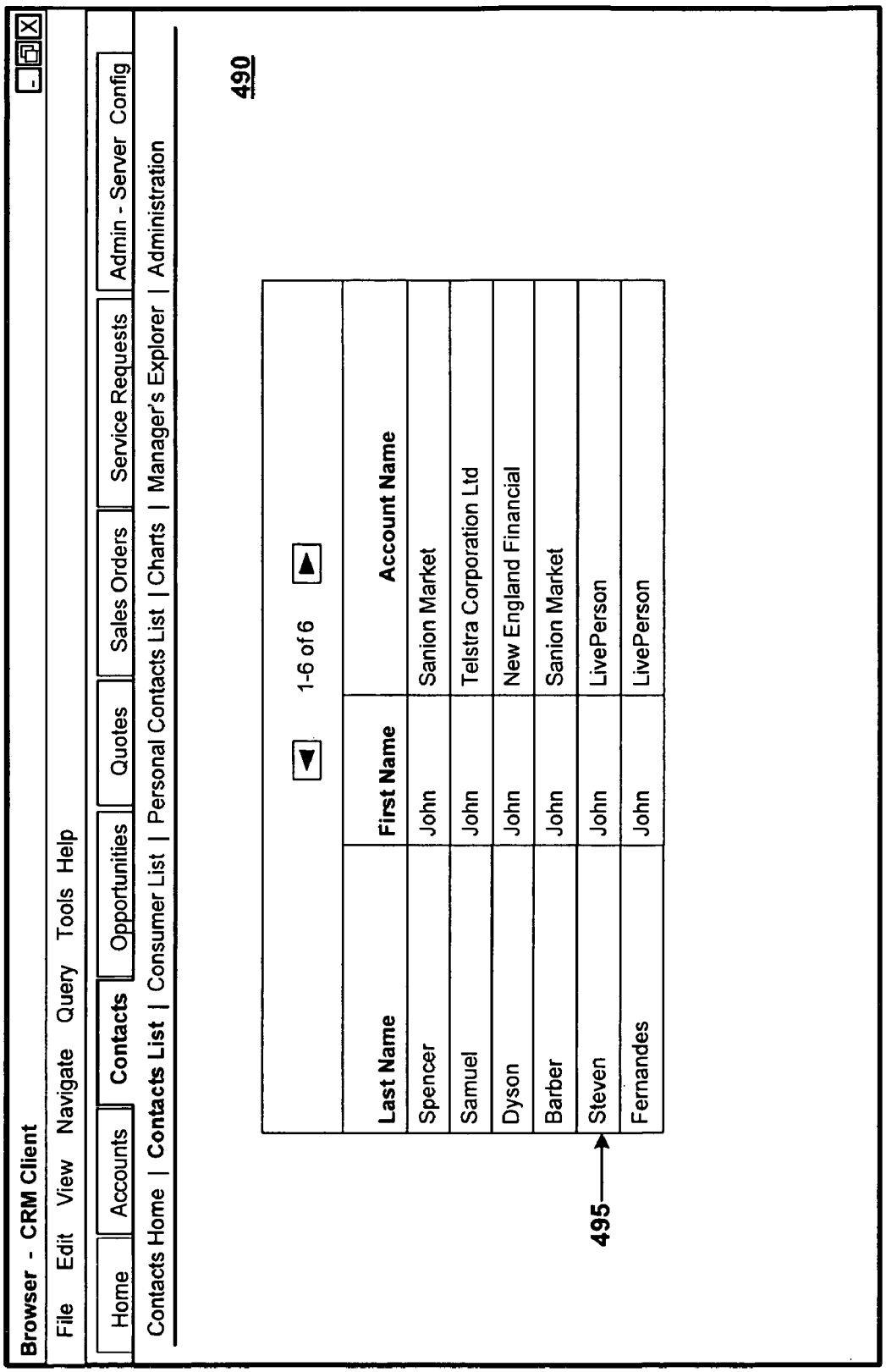
FIG. 4C depicts a portion of an interface displaying the data items of interest found based on search conditions specified for attributes of primary and/or secondary entities in one embodiment.

FIGS. 4A-4C together illustrates a search interface which enables users to find data items of interest from a database system (data store 180) in one embodiment. The description is continued assuming that the search interface is provided by query tool 150 in the form of web pages, which are then viewed/displayed using a browser application executing in any one of client systems 110A-110C. The search interface may be displayed on a display unit (not shown) associated with the client systems. Each of the Figures is described in detail below.

FIG. 4A depicts a portion of a search interface which enables a user to specify search conditions for attributes of entity types (selected entity type and related secondary entity types) in one embodiment. FIG. 4A is also used to illustrate the manner in which secondary entities corresponding to an entity type selected by a user are displayed in one embodiment.

Display area 410 is shown containing one or more tabs, with each tab labeled with an identifier of an entity type maintained in data store 180 (in the CRM system). The tab labeled "Contacts" is shown highlighted (in front of the other tabs and with the label in bold) indicating that the user has made a selection of the identifier indicating an entity type of interest. Query tool 150 determines that the "Contacts" entity type is the selected entity type.

Button 415 labeled "Enter Query" enables a user to indicate that a search for (attributes of) desired instances of the "Contacts" entity type is to be performed. On selecting/clicking button 415, window 420 labeled "Contacts Query" is shown to the user. Window 420 represents a flexible search interface implementing various aspects of the present invention in one embodiment.

Accordingly, window 420 is shown containing selection list 430 having the attributes of the primary/selected entity type "Contacts" (as indicated by the text "Select Contacts Criteria") and selection list 450 containing a set of secondary entities such as "Accounts", "Opportunities", "Orders", "Service Requests" and "Agreements" etc. which are related to "Contacts" entity type.

Query tool 150 identifies the set of secondary entities that are related to "Contacts" entity type (the primary entity) based on the schema definition contained in data store 180. For example, the schema maintained in data store 180 may specify that the "Accounts" entity type contains a foreign key that is related to the primary key of the "Contacts" entity type thus indicating the relationship between the two entity types, with the "Contacts" entity type being the primary entity and the "Accounts" entity type being the secondary entity.

Thus, using window 420, the user is able to indicate the search conditions for finding the attributes of the entity instances of "Contacts" entity type (the data items of interest), by specifying corresponding conditions associated with any of the attributes of "Contacts" (primary) entity type and/or the secondary entity types (identified by query tool 150). The manner in which the user may specify search conditions is described below.

The user first selects the attribute "FirstName" (shown in bold) from selection list 420, a condition operator "=" in button group 435 and indicates the value to be examined as "John" in text field 440. The user then clicks on button 448 (labeled "+") to add the specified search condition into display area 480. Display area 480 displays all of the search conditions specified by the user.

Similarly, the user may select and specify other search conditions for the same or different attributes of the primary entity type and add the search conditions to display area 480. The user may remove a specified search condition by selecting the "X" button shown corresponding to the search condition in display area 480.

A user may also indicate the manner in which the multiple search conditions are to be combined by selecting a logical operator such as "AND", "OR", "NOT AND", "NOT OR", etc. in list 445. The user selection of the logical operator in list 445 may specify whether all, some or any of the search conditions are to be satisfied (and have to be checked when searching for instances of the selected entity type).

A user may specify search conditions associated with attributes of any of the related secondary entity types by first selecting a secondary entity type from selection list 450 and then specifying the desired search condition as described in detail below.

FIG. 4B depicts a portion of a search interface which enables a user to specify search conditions for attributes of a selected secondary entity type in one embodiment. Similar numbers are used to represent corresponding portions of FIGS. 4A and 4B and hence the description of such portions is not repeated for conciseness.

Window 420 depicts the search interface displayed/updated in response to a user selecting a secondary entity type "Accounts" from the list of secondary entities provided in selection list 450 (as indicated by the text "Select Accounts Criteria"). The list of attributes for the selected secondary entity "Accounts" is shown in selection list 460, with the attribute "Status" selected (shown in bold).

Button group 465, text field 470 and list 475 may be used similar to button group 435, text field 440 and list 445 to specify search conditions for the attributes of the selected secondary entity "Accounts". The specified search conditions may be added to display area 480 by selecting button 478 (labeled "+"). Similarly, a user may select other secondary entities using selection list 450, specify additional search conditions for the corresponding attributes of the selected secondary entities and then add them to display area 480.

Accordingly, display area 480 specifies the list of user specified search conditions that are to be used while searching for instances of the "Contacts" entity type (the selected primary entity). Display area 480 is shown containing three rows respectively specifying the search conditions Contacts [FirstName]="John", Accounts [Status]="Gold" and ServiceRequests [Type]="Email".

It may be noted that the first row condition is specified for the attributes of the primary entity, while the second and third row conditions are specified for attributes of secondary entities that are related to the primary entity. The three search conditions (together forming the search criteria) indicate that the user desires to find the "Contact" entity instances whose first name is "John", who have a "Gold" account and who have raised an "Email" type service request. It should be noted that such a search criteria cannot be specified using the interfaces of FIGS. 2A and 2B, unless the programmer developing the interfaces had envisaged such a search requirement.

A user may then select/click button 485 (labeled "Go") to send a (single) search request containing various parameters including all of the search conditions (shown in display area 480) via network 120 to query tool 150. In response to receiving the (single) user/search request, query tool 150 determines the "Contacts" entity instances satisfying the specified search conditions. The data items of interest in the determined entity instances may then be displayed to the user as described below with examples.

FIG. 4C depicts a portion of an interface displaying the data items of interest found based on search conditions specified for attributes of primary and/or secondary entities in one embodiment.

Display area 490 depicts the details of interest such as the values of the attributes "Last Name", and "First Name" of the primary entity "Contacts" and the attribute "Account Name" of the secondary entity "Accounts". In particular, row 495 indicates that the Contact entity having first name "John", last name "Steven" and account name "LivePerson" satisfies the search conditions specified by the user/agent.

It may be appreciated that users/agents may request for additional details of interest to be displayed in display area 490. For example, the specific attributes to be displayed in the search results (the data items of interest) may be specified by the user using an appropriate interface, and the specific attributes may then be sent as part of the search request to query tool 150. The content of display area 490 may then be accordingly modified to include such additional details/specific attributes as well.

Thus, a user is enabled to find data items of interest based on search conditions specified for the attributes of a selected entity type (the primary entity) and the related secondary entities. The benefit of such a feature may be appreciated considering the fact that each of many users of the search interface may provide custom search criteria, without having to depend on the programmer's judgment. In addition, the user is shielded from the schema definition type underlying details, while showing selectively the specific entity types that are likely to be of interest in forming the desired search criteria.

Accordingly, the user may be able to find the data items of interest more precisely and using less amount of time and/or resources (since the user is able to specify the desired conditions in a single user/search request). Further, a user may avoid performance of multiple searches (either independent or in a cascading manner) and manual comparison of the search results to identify the data items of interest (as may be required when using the interfaces of FIGS. 2A and 2B).

It may be appreciated that the determination of the secondary entities related to a primary entity, the attributes of the primary entity/selected secondary entities and the primary entities matching/satisfying the user specified search conditions needs to be performed consistent with the manner in which data in the CRM system is modeled. The manner in which data is modeled as entities (and corresponding determination performed) in one embodiment is described below with examples.

6. Sample Entity Data

Figure 5:
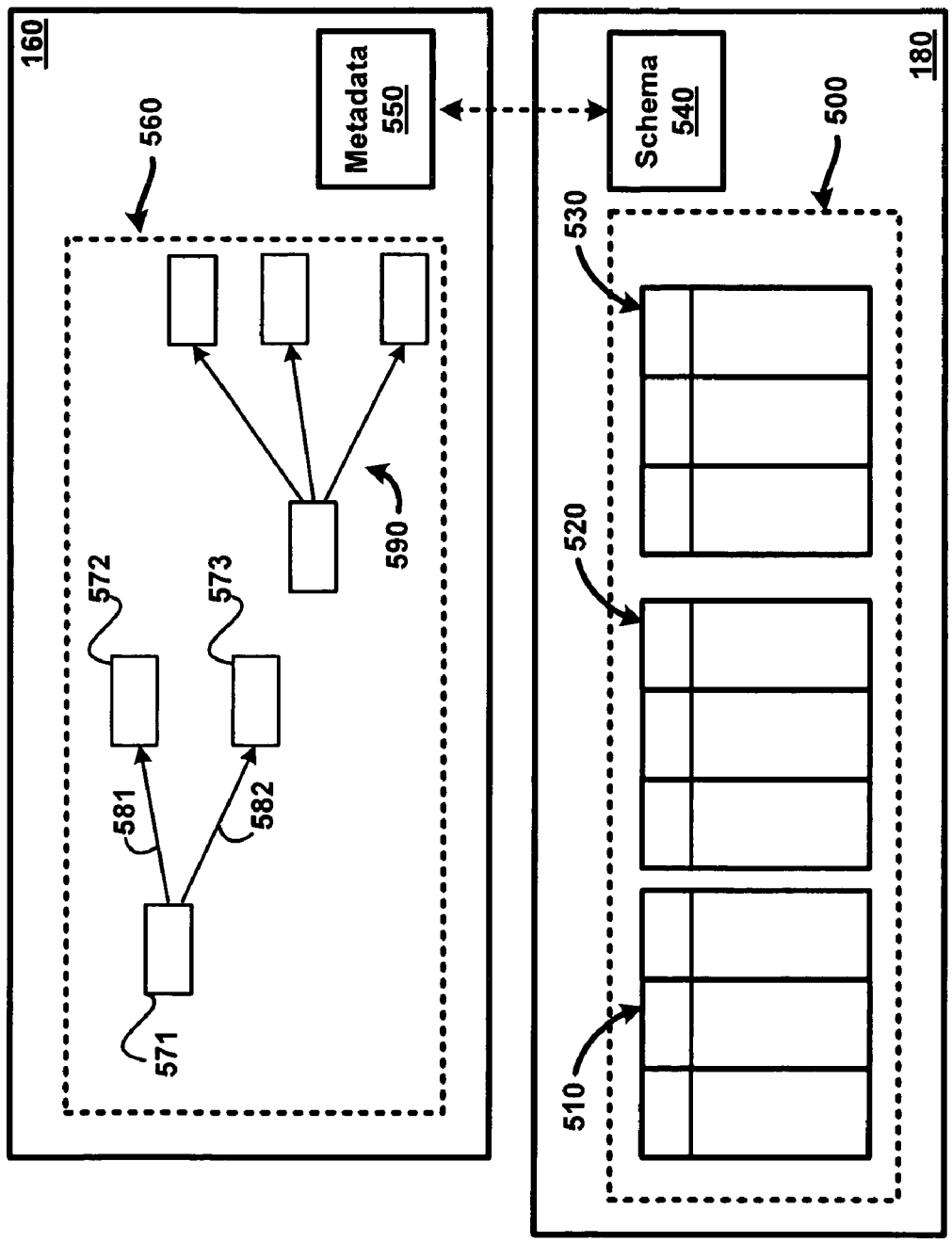
FIG. 5 is a block diagram illustrating the manner in which secondary entities are determined corresponding to an entity selected by a user, in one embodiment.
Figure 6:
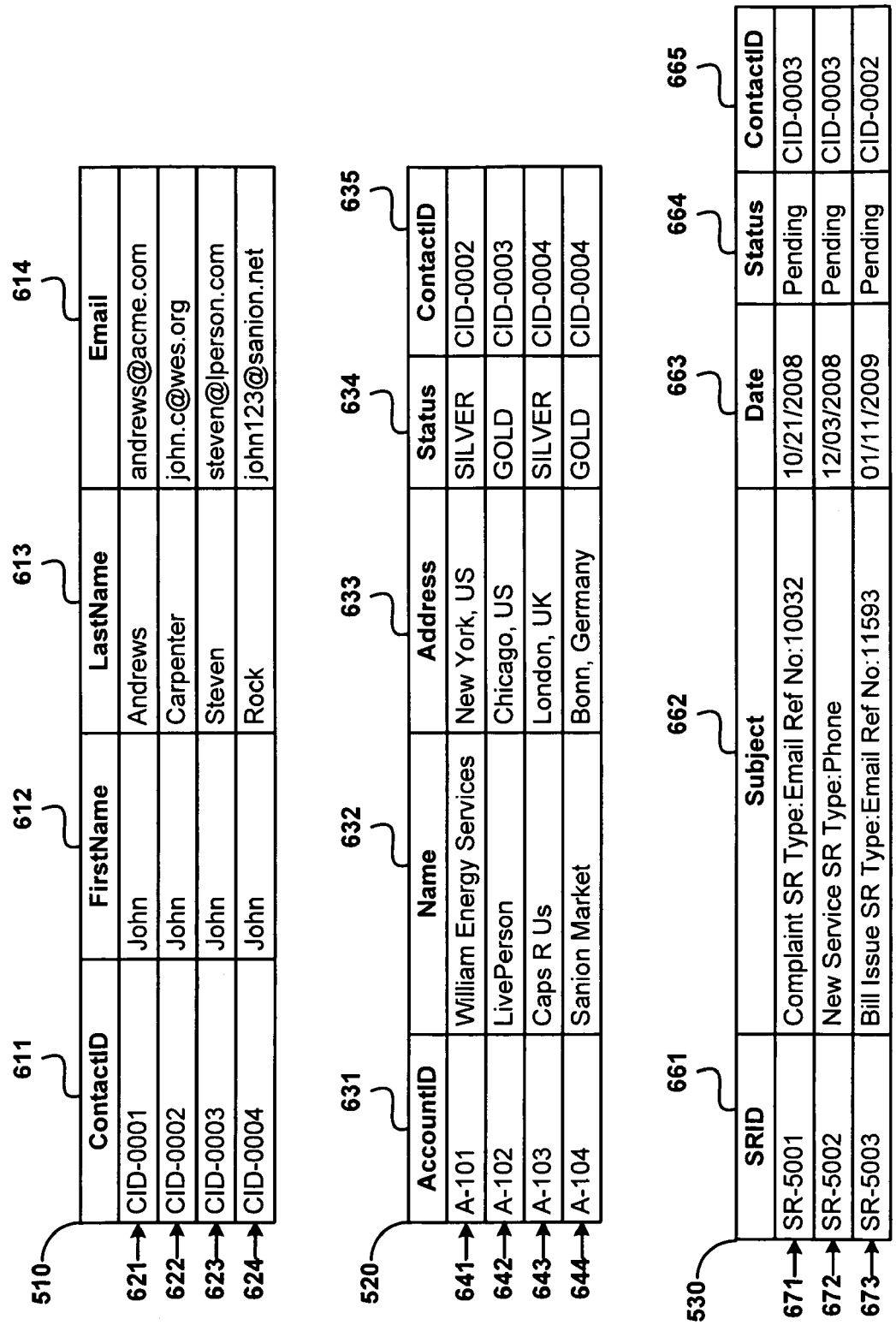
FIG. 6 depicts the manner in which data is modeled as entities/objects in a database system in one embodiment.

FIGS. 5 and 6 together depict the manner in which data is modeled as entities/objects in a CRM system in one embodiment. The entity types and corresponding instances/relationships are shown as being maintained in CRM server 160 and data store 180. For conciseness, only a few entity types and the corresponding instances, attributes and/or relationships are shown in the Figures. However, data in a typical CRM system may be modeled as several entity types/attributes/entity instances and having different relationships among the entity types.

Data store 180, implemented according to relational database technologies, is shown containing database 500, which may store entity data used by one or more CRM applications executing in CRM server 160. Each entity type is shown modeled and stored in the form of a table in database 500, with the rows of the table representing the instances of the entity type and the columns of the table representing the attributes of the entity type.

Accordingly, each of tables 510, 520 and 530 in database 500 represents a corresponding entity type. The description is continued assuming that tables 510, 520 and 530 respectively represent the corresponding entity types "Contacts", "Accounts" and "Service Requests". Each of tables 510, 520 and 530 is shown having multiple columns, each of which represents an attribute of the entity type. Data elements are stored in each of the columns and represent the attribute values of the entity instances.

Referring to FIG. 6, table 510 is shown containing columns 611-614 representing the attributes of the entity type "Contacts" and rows 621-624 representing the individual "Contacts" entity instances. Thus, primary key column 611 "ContactID", column 612 "FirstName", column 613 "LastName" and column 614 respectively specify a unique identifier (primary key), first name, last name and email address attributes of each "Contacts" entity type. As is well know, the data elements stored in column 611 uniquely identify each row of the corresponding tables (and accordingly the corresponding entity instances).

Each of rows 621-624 specifies the details of a corresponding "Contacts" entity instance. In particular, row 621 specifies a "Contacts" entity instance uniquely identified by the value "CID-0001" (primary key), having a first name "John", last name "Andrews" and a corresponding email address (not shown). Similarly, other rows 622-624 respectively specify the details of other "Contacts" entity instances.

Similarly, table 520 is shown containing primary key column 631 "AccountID", column 632 "Name", column 633 "Address" and column 634 "Status" respectively specifying a unique identifier (primary key), a name, address, and status attributes of each "Accounts" entity type. Further, each of rows 641-644 specifies the details of a corresponding "Accounts" entity instance.

Table 520 is also shown containing foreign key column 635 "ContactID" whose data elements are required to be one of the data elements present in a primary key column (such as 611) of another table (510). Such a requirement may be viewed as defining a relationship between the tables containing foreign key columns and the corresponding primary key columns. In particular, a row in table 510 having a specific data element for the primary key column 611 is viewed as having a relationship with the rows in table 520 having the same specific data element specified in foreign key column 635. Thus, the "Accounts" entity instance specified in row 641 is viewed as being related to the "Contacts" entity instance specified in row 622 (based on the identifier value "CID-0002" in column 635 of row 641).

Similarly, the relations between other "Contacts" and "Accounts" entity instances may be specified using an appropriate combination of foreign keys and primary keys. Table 510 (and corresponding entity type) having a primary key may be viewed as a primary entity and tables 520 and 530 (and corresponding entity types) having a foreign key related to the primary key may be viewed as secondary entities that have a relationship with the primary entity.

It may be noted that the relations between the "Accounts" and "Contacts" entities may also be identified by maintaining identifier values of "Accounts" entity instances specified in primary key column 631 in an additional foreign key column (not shown) in table 510. Alternatively, the relations between two entity types may be maintained as an independent table (as is well known for representing many to many relationships between tables). The independent table in general contains pairs of Contact and Account identifiers, with each pair indicating that the "Contacts" entity instance identified by the contact identifier in the pair is related to the "Accounts" entity instance identified by the account identifier in the same pair.

Table 530 is shown containing primary key column 661 "SRID", column 662 "Subject", column 663 "Description" and column 664 "Status" respectively specifying a unique identifier, subject, description, and status attributes of each "Service Requests" entity type. Foreign key column 665 "ContactID" is used to specify the related "Contacts" and "Service Requests" entity instances. Each of rows 671-673 specifies the details of a corresponding "Service Requests" entity instances.

Referring back to FIG. 5, schema 540 represents data in data store 180 indicating the definition of each of the table and the corresponding columns as well as data representing the relationship between the tables (for example, by indicating the primary keys and the related foreign keys, described above). It may be appreciated that schema 540 may also contain additional data corresponding to values of various database parameters such as name of the database, the location of the database, etc.

Metadata 550 contains data specifying the details/attributes of entity types (such as "Contacts", "Accounts", "Service Requests", etc.) defined in the CRM system, the relationship between the entity types, etc. In one embodiment, metadata 550 corresponds to the underlying schema 540 specifying the details of the entity data stored in database 500. Accordingly, a CRM application (or query tool 150) retrieves the desired entity types and their attributes (values) from data 500 (based on metadata 550) and generates memory objects corresponding to the entity types and entity instances in memory 560.

Memory 560 represents a portion of a volatile memory (in CRM server 160) storing portions of entity data in the form of one or more memory objects (such as 571-573), with each memory object representing a portion of memory storing the details of an entity type or entity instance. The memory objects are generated based on the definitions maintained in metadata 550.

Thus, each of memory objects 571-573 may respectively represent the corresponding entity type "Contacts", "Accounts" and "Service Requests". Each of links 581-582 represents a memory pointer between the objects and indicates a relationship existing between the corresponding entity types. For example, link 581 from object 571 to object 572 indicates that a relationship exists between the "Contacts" entity type (the primary entity) and the "Accounts" entity type (the secondary entity). Similarly, the link 6582 indicates a relationship between the "Contacts" entity type (object 571) and the "Service Requests" entity type (object 573).

It may be noted that memory objects corresponding to the entity instances (based on the rows of the underlying tables corresponding to the entity types) may also be generated by query tool 150 or CRM applications executing in CRM server 160. The entity instances memory objects (such as 590) may also be linked to each other based on the relationship between the entity instances. Though the memory objects are described above as representing data in a database, it may be appreciated that the memory objects may be generated based on data in other data sources such as files as well.

Thus, entity data is maintained in data store 180 and also as memory objects in CRM server 160. Query tool 150 may access the entity data shown in FIGS. 5 and 6 (and/or the corresponding schema 540 and metadata 550) for determining the information required for providing the search interface of FIGS. 4A-4C. The manner in which query tool 150 determines the required information, such as the attributes of the primary entity, the list of related secondary entities (for a primary entity) and the corresponding attributes, the search results, etc. is described in detail below.

7. Providing the Search Interface

In an embodiment, query tool 150 is designed to inspect schema 540 to determine the entity types (tables) defined in database 500 and then display identifiers of the determined entity types (as shown in display area 410 in FIG. 4A). On receiving a selection (e.g. "Contacts") from the user, query tool 150 determines the table/entity type (e.g. 510) corresponding to the selection and then identifies the entity types/tables (e.g. tables 520, 530) that have a relationship (as a secondary entity) with the selected entity/table. Query tool 150 then provides the identifiers of the secondary entities/tables (e.g. "Accounts", "Service Requests") in selection list 450, thereby enabling the user to specify search criteria based on the attributes of the selected/secondary entities (as shown in FIG. 4B).

In an alternative embodiment, query tool 150 is designed to inspect the memory objects 571-573 created in memory 560 based on metadata 550. Thus, query tool 150 is designed to first display identifiers of pre-defined set of entity types in display area 410 of FIG. 4A. On receiving a selection (e.g. "Contacts") from the user, query tool 150 determines the memory object (e.g. 571) corresponding to the selected entity type and then identifies the memory objects/entity types (e.g. 572, 573) that are linked (as a secondary entity) with the selected entity type. Query tool 150 then provides the identifiers of the linked secondary entities (e.g. "Accounts", "Service Requests") in selection list 450 (as shown in FIG. 4B).

The description is continued assuming that the search interfaces of FIGS. 4A-4C are provided by query tool 150 based on inspecting schema 540 (and the entity data maintained in tables 510, 520 and 530 as shown in FIG. 6).

With respect to FIG. 4A, in response to user selecting/clicking button 415 (after selecting the "Contacts" tab in display area 410), query tool 150 may determine (by examining schema 540, in the form of either metadata or the in-memory objects, described above) that the columns of the table (510) corresponding to the entity type "Contacts", are to be displayed as attributes of the primary entity in display area 430. Thus, display area 430 is shown containing the attributes "FirstName", "LastName", and "Email" corresponding to the columns 612-614 of table 610.

Further, query tool 150 determines the list of secondary entities to be shown in selection list 450 by checking for entity types that have a foreign key column defined corresponding to the primary key column/attribute "ContactID" of the "Contacts" entity type. Thus, query tool 150 may examine the schema (of FIG. 5) to determine that tables 630 and 660 (corresponding to the "Accounts" and "Service Requests" entities) have foreign key columns which store the identifiers specified in the "ContactID" column 611. Accordingly, the entities "Accounts" and "Service Requests" are determined to be secondary entities that are related to the primary entity "Contacts" and are accordingly included in selection list 450.

With respect to FIG. 4B, in response to a user selecting a secondary entity in selection list 450, query tool 150 determines (e.g., based on the schema) the attributes of the secondary entity similar to the determination of the attributes of the primary entity (based on the columns contained in the tables 520 and 530) and then displays the determined attributes in display area 460.

In response to the user selecting button 485 and receiving a corresponding search request indicating the search conditions (e.g. as shown in display area 480), query tool 150 first generates a SQL query designed to retrieve the instance of the "Contacts" primary entity that satisfy/match the user specified conditions. Accordingly, for the search conditions shown in display area 480, query tool 150 may generate a corresponding SQL query as follows:

SELECT   Contacts.FirstName,   Contacts.LastName, Accounts.Name
    FROM Contacts, Accounts, ServiceRequests
    WHERE Contacts.ContactID=Accounts.ContactID
    AND Contacts.ContactID=ServiceRequests.ContactID
    AND Contacts.FirstName="John"
    AND Accounts.Status="GOLD"
    AND ServiceRequests.Subject LIKE "% SR Type:Email %"

Wherein, "SELECT", "FROM", "WHERE", "AND" and "LIKE" are keywords specified by SQL, and "Contacts", "Accounts" and "ServiceRequests" are the names of the tables (510, 520 and 530) respectively storing the contacts, accounts and service requests entity instances. The column names used in the query correspond to the column names indicated in FIG. 6.

It may be observed that the SQL query is designed to retrieve the data in the three tables 510, 520 and 530 based on the common values in the "ContactID" column (i.e., using joins as is well known in the relevant arts) and to determine the "Contacts" entity instances matching the three conditions specified in display area 480 (as indicated by the last three lines of the query). The SQL query is also designed to retrieve only the data items in the first name, last name and the corresponding account name columns/attributes of the matching "Contacts" entity instances/rows.

It should be noted that the last condition ServiceRequests [Type]="Email" in display area 480 may be translated to the condition ServiceRequests.Subject LIKE "% SR Type:Email %" based on additional information maintained in data store 180. The additional information maintained may also specify attributes (not corresponding to columns) for the primary/secondary entities and the manner in which a corresponding search is to be performed based on such attributes.

Query tool 150 then executes the generated SQL query to determine the search results and then sends the output of execution of the generated SQL query to the client system from which the search request was received. The search results may then be displayed similar to FIG. 4C. It may be observed that the execution of the above described SQL query for the sample entity data shown in FIG. 6 will cause the information shown in row 495 of FIG. 4C to be retrieved and displayed.

The query shown above is a single query issued to the database system based on a user specifying the input search criteria only once for multiple entities. However, in some alternative embodiments, it may be noted that the query execution is internal to the system implementation, and depending on performance it may choose the best and most efficient way to execute the query criteria, while still taking input from the user just once for multiple entities. Furthermore, the desired entity instances of interest of a primary entity type can be constrained by conditions specified on the attributes of both the primary entity type and one or more related secondary entities.

Thus, query tool 150 provides a flexible search interface for finding entity instances (data items) of interest in a database system. Though an example search interface is shown and described with respect to FIGS. 4A-4C, it may be appreciated that in alternative embodiments, the search interface may be provided in any convenient manner according to several aspects of the present invention as well the specific requirements of the users of the CRM system. The description is continued illustrating a flexible search interfaces provided by a CRM system in two alternative embodiments.

8. Alternative Embodiments

Each of FIGS. 7 and 8 depicts alternative embodiments of the search interface for finding data items of interest (such as details/attributes of "Contacts" entity instances) in a database system (data store 180 in the CRM system of FIG. 1). The search interfaces of FIGS. 7 and 8 (similar to FIGS. 4A-4C) are provided by query tool 150 in the form of web pages, which are then viewed/displayed using a browser application executing in any of client systems 11A-110C. Each of the Figures is described in detail below.

Referring to FIG. 7, display area 710 enables a user to select an entity type ("Contacts" shown highlighted) similar to display area 410 of FIG. 4A. Window 720 (labeled "Contacts Query") represents a pop up window that is displayed in response to a user clicking/selecting button 715 (labeled "Enter Query"). Display area 730 enables a user to specify search conditions corresponding to the attributes of the selected entity type "Contacts" using the corresponding text fields/selection lists.

Display area 750 provides a list of secondary entities (identified by query tool 150 based on data contained in data store 180) corresponding to the selected entity type "Contacts" in the form of tabs. A user may select any desired secondary entity type (such as "Activities") by selecting the corresponding tab in display area 750. The attributes of the selected secondary entity type are then displayed in display area 770, thereby enabling the user to specify conditions for attributes of the selected secondary entity type using the corresponding text fields/selections lists.

Similarly, the user may specify any desired conditions for the attributes of the selected entity type and corresponding secondary entity types in a single user interface. The user may then select button 785 (labeled "Go") to send a (single) user/search request to query tool 150 containing the user specified conditions. The results of the search may then be provided/displayed similar to the interface of FIG. 4C, and accordingly the description of the results is not repeated here for conciseness.

Referring to FIG. 8, display area 810 enables a user to select an entity type ("Contacts" shown highlighted) similar to display area 410 of FIG. 4A. Window 820 (labeled "Contacts Query") represents a pop up window that is displayed in response to a user clicking/selecting button 815 (labeled "Enter Query").

On initial display, a graphical representation of the selected entity type "Contacts" is shown as edit box 860, containing the name "Contacts" of the entity type at the top, a toggle button labeled "Results", another toggle button labeled "Query Spec" and a text field with a "Edit" button. Each of the toggle buttons may be enabled (as indicated by the value "Y") or disabled (value "N") to indicate the user preference. The "Results" toggle button is used to indicate whether the attributes of the "Contacts" entity type are to be included in the search results, while the "Query Spec" toggle button is used to indicate whether a search condition is to be specified for the "Contacts" entity type. The text field enables a user to specify a search condition (e.g., [FirstName]="John") for attributes of the "Contacts" entity type (when the "Query Spec" toggle button is enabled).

A user may then click on button 840 (labeled "+") to view a list of secondary entities corresponding to the primary "Contacts" entity as shown by selection list 850. The list of secondary entities may be identified by query too 150 based on data contained data store 180, as described above. On a user selecting a secondary entity type, a corresponding edit box for the selected secondary entity (similar to edit box 860) is also shown in window 820. Thus, edit boxes 870 and 880 respectively indicate the selected secondary entities "Accounts" and "Activities". A user can enable/disable the toggle buttons of the edit boxes corresponding to the secondary entities and also specify conditions (e.g. [Status]="Gold") for the attributes of the selected secondary entities in the corresponding text fields.

Lines 867 and 868 indicate that the entities represented by the edit boxes are related to each other. Lines 867 and 868 may be respectively displayed along with edit boxes 870 and 880 on selection of the corresponding secondary entities from selection list 850. A user may remove an edit box and the corresponding selected secondary entity from window 820 using button 845 (labeled "−").

A user may specify any desired conditions for the attributes of the selected entity type and corresponding secondary entity types and then select button 885 (labeled "Go") to send a (single) user/search request to query tool 150 containing the user specified conditions. The results of the search may then be provided/displayed similar to the interface of FIG. 4C and accordingly the description of the results is not repeated here for conciseness.

It should be further appreciated that the features described above can be implemented in various embodiments as a desired combination of one or more of hardware, executable modules, and firmware. The description is continued with respect to an embodiment in which various features are operative when instructions in such executable modules are executed.

9. Digital Processing System

FIG. 9 is a block diagram illustrating the details of digital processing system 900 in which various aspects of the present invention are operative by execution of appropriate executable modules. Digital processing system 900 may correspond to a system executing query tool 150 (e.g. CRM server 160) or any of client systems 110A-110C.

Digital processing system 900 may contain one or more processors (such as a central processing unit (CPU) 910), random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general-purpose processing unit. RAM 920 may receive instructions from secondary memory 930 using communication path 950. In addition to providing instructions for execution to CPU 910, RAM 920 may store various data (e.g., memory objects of FIG. 5, the results of execution, and several operands for the instructions).

Graphics controller 960 generates display signals (e.g., in RGB format) to display unit 970 based on data/instructions received from CPU 910. Display unit 970 contains a display screen to display the images (such as the portions of the user interfaces depicted in FIGS. 2A-2B, 4A-4C, 7 and 8) defined by the display signals. Input interface 990 may correspond to a keyboard and a pointing device (e.g., touch-pad, mouse) and may be used to provide various inputs (for example, for interacting with the interfaces of FIGS. 4A-4C, 7 and 8). Network interface 980 provides connectivity to a network (e.g., using Internet Protocol), and may be used to communicate with other connected systems (such as CRM server 160 or client systems 110A-110C) of FIG. 1.

Secondary memory 930 may contain hard drive 935, flash memory 936, and removable storage drive 937. Secondary memory 930 may store the data (for example, portions of the entity data shown in FIGS. 5 and 6) and software instructions, which enable digital processing system 900 to provide several features in accordance with the present invention.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer implemented method of enabling a user to search for data items of interest in a database system, said method comprising:
   storing a plurality of data items in said database system according to a plurality of relationships, said plurality of data items representing a plurality of entity instances, each of said plurality of entity instances being one of a plurality of entity types, each relationship specifying an entity type as a primary entity and another entity type as a secondary entity;
   displaying a first set of entity types on a display unit, wherein said first set of entity types is contained in said plurality of entity types;
   receiving a first selection from said user, said first selection indicating a first entity type contained in said first set of entity types;
   identifying, in response to said receiving of said first entity type as said first selection, a second set of entity types contained in said plurality of entity types, wherein each of said second set of entity types is related as a respective secondary entity to said first entity type according to said plurality of relationships; and
   enabling said user to request a search on a combination of said first entity type and at least one of said second set of entity types to determine a set of entity instances of interest contained in said plurality of entity instances, wherein said user is enabled to request said search after said identifying.

2. The computer implemented method of claim 1, wherein said identifying comprises examining data representing a schema defining said plurality of entity types in said database system, wherein said schema further specifies the primary entity and the secondary entity for each of said plurality of relationships.

3. The computer implemented method of claim 2, wherein said plurality of entity types represent a corresponding plurality of object types, wherein said schema specifies for each of said plurality of relationships, one object type as said primary entity and another object type as said secondary entity.

4. The computer implemented method of claim 2, wherein said database system is a relational database system, wherein said plurality of data items are stored in the form of a plurality of tables characterized by a set of primary keys and a set of foreign keys, wherein said schema indicates for each table a corresponding primary key and a corresponding subset of foreign keys, wherein each primary entity is a table containing a primary key and a corresponding secondary entity is a table having an associated foreign key tied to said primary key.

5. The computer implemented method of claim 2, wherein each of said plurality of entity types is defined by said schema to include a corresponding set of attributes, wherein said enabling enables said user to provide respective data values associated with corresponding ones of a desired set of attributes, wherein said search comprises examining data stored in said database system for entity instances matching the combination of desired attribute and specified corresponding data value, wherein the matching entity instances represents the result of said search.

6. The computer implemented method of claim 5, wherein said set of entity instances of interest are of said first entity type.

7. The computer implemented method of claim 6, wherein said first set of entity types are searched more often than the remaining ones of said plurality of entity types.

8. The computer implemented method of claim 7, wherein said first set of entity types are primary entities.

9. A system for enabling a user to search for data items of interest in a database system, wherein said database system stores a plurality of data items according to a plurality of relationships, said plurality of data items representing a plurality of entity instances, each of said plurality of entity instances being one of a plurality of entity types, each relationship specifying an entity type as a primary entity and another entity type as a secondary entity, said system comprising:

a processor;
a random access memory;
a display unit; and
a machine readable medium storing one or more sequences of instructions, wherein execution of said one or more sequences of instructions by said processor causes said system to perform the actions of:
displaying a first set of entity types on said display unit, wherein said first set of entity types is contained in said plurality of entity types;
receiving a first selection from said user, said first selection indicating a first entity type contained in said first set of entity types;
identifying, in response to said receiving of said first entity type as said first selection, a second set of entity types contained in said plurality of entity types, wherein each of said second set of entity types is related as a respective secondary entity to said first entity type according to said plurality of relationships; and
enabling said user to request a search on a combination of said first entity type and at least one of said second set of entity types to determine a set of entity instances of interest contained in said plurality of entity instances, wherein said user is enabled to request said search after said identifying.

10. The system of claim 9, wherein each of said plurality of entity types is defined to include a corresponding set of attributes, wherein said enabling comprises:
identifying the attributes associated with said first entity type and said at least one of said second set of entity types;

displaying the identified attributes on said display unit; and
receiving from said user respective data values associated with corresponding ones of a desired set of attributes.

11. The system of claim 10, wherein said identifying comprises examining data representing a schema defining said plurality of entity types in said database system, wherein said schema further defines attributes of each entity type and specifies the primary entity and the secondary entity for each of said plurality of relationships.

12. The system of claim 11, wherein said database system is a relational database system, wherein said plurality of data items are stored in the form of a plurality of tables characterized by a set of primary keys and a set of foreign keys, wherein said schema indicates for each table a corresponding primary key and a corresponding subset of foreign keys, wherein each primary entity is a table containing a primary key and a corresponding secondary entity is a table having an associated foreign key tied to said primary key.

13. The system of claim 11, wherein said plurality of entity types represent a corresponding plurality of object types stored in said random access memory, wherein said schema specifies for each of said plurality of relationships, one object type as said primary entity and another object type as said secondary entity.

14. The system of claim 10, wherein said set of entity instances of interest are of said first entity type.

15. The system of claim 14, wherein said first set of entity types are searched more often than the remaining ones of said plurality of entity types.

16. The system of claim 15, wherein said first set of entity types are primary entities.

17. A machine readable medium storing one or more sequences of instructions for causing a system to enable a user to search for data items of interest in a database system, wherein execution of said one or more sequences of instructions by one or more processors contained in said system causes said system to perform the actions of:

storing a plurality of data items in said database system according to a plurality of relationships, said plurality of data items representing a plurality of entity instances, each of said plurality of entity instances being one of a plurality of entity types, each relationship specifying an entity type as a primary entity and another entity type as a secondary entity;
displaying a first set of entity types on a display unit, wherein said first set of entity types is contained in said plurality of entity types are searched more often than the remaining ones of said plurality of entity types, wherein said first set of entity types are primary entities;
receiving a first selection from said user, said first selection indicating a first entity type contained in said first set of entity types;
identifying, in response to said receiving of said first entity type as said first selection, a second set of entity types contained in said plurality of entity types, wherein each of said second set of entity types is related as a respective secondary entity to said first entity type according to said plurality of relationships; and
enabling said user to request a search on a combination of said first entity type and at least one of said second set of entity types to determine a set of entity instances of interest contained in said plurality of entity instances, wherein said user is enabled to request said search after said identifying.

18. The machine readable medium of claim 17, wherein said identifying comprises examining data representing a schema defining said plurality of entity types in said database system, wherein said schema further specifies the primary entity and the secondary entity for each of said plurality of relationships.

19. The machine readable medium of claim 18, wherein said database system is a relational database system, wherein said plurality of data items are stored in the form of a plurality of tables characterized by a set of primary keys and a set of foreign keys, wherein said schema indicates for each table a corresponding primary key and a corresponding subset of foreign keys, wherein each primary entity is a table containing a primary key and a corresponding secondary entity is a table having an associated foreign key tied to said primary key.

20. The machine readable medium of claim 19, wherein each of said plurality of entity types is defined by said schema to include a corresponding set of attributes, wherein said enabling enables said user to provide respective data values associated with corresponding ones of a desired set of attributes, wherein said search comprises examining data stored in said database system for entity instances matching the combination of desired attribute and specified corresponding data value, wherein the matching entity instances represents the result of said search.

* * * * *

UNITED STATES PATENT AND TRADEMARK OFFICE
CERTIFICATE OF CORRECTION

| | | |
|---|---|---|
| PATENT NO. | : 8,019,783 B2 | Page 1 of 1 |
| APPLICATION NO. | : 12/468078 | |
| DATED | : September 13, 2011 | |
| INVENTOR(S) | : Gill et al. | |

It is certified that error appears in the above-identified patent and that said Letters Patent is hereby corrected as shown below:

On cover page, in column 1, under "Inventors", line 1, delete "Mohail" and insert -- Mohali --, therefor.

On cover page, in column 2, under "Other Publications", line 7, delete "GUIDGE" and insert -- GUIDE --, therefor.

In column 15, line 22, delete "11A-110C." and insert -- 110A-110C. --, therefor.

In column 16, line 9, delete "too" and insert -- tool --, therefor.

Signed and Sealed this
Twenty-ninth Day of November, 2011

David J. Kappos
*Director of the United States Patent and Trademark Office*